United States Patent
Babu et al.

(10) Patent No.: US 10,642,667 B1
(45) Date of Patent: May 5, 2020

(54) APPARATUS, SYSTEM, AND METHOD FOR EFFICIENTLY SHARING DATA BETWEEN PROCESSES

(71) Applicant: Juniper Networks, Inc., Sunnyvale, CA (US)

(72) Inventors: Thilak Raj Surendra Babu, Milpitas, CA (US); Abbas Y. Sakarwala, San Jose, CA (US); Adithya Hemakumar, Campbell, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 151 days.

(21) Appl. No.: 15/924,256

(22) Filed: Mar. 18, 2018

(51) Int. Cl.
*G06F 9/54* (2006.01)
*G06F 12/02* (2006.01)

(52) U.S. Cl.
CPC .............. *G06F 9/544* (2013.01); *G06F 9/541* (2013.01); *G06F 12/02* (2013.01)

(58) Field of Classification Search
CPC ....................................................... G06F 9/544
See application file for complete search history.

(56) References Cited

U.S. PATENT DOCUMENTS

| | | | | |
|---|---|---|---|---|
| 2005/0102670 A1* | 5/2005 | Bretl | ....................... | G06F 9/544 718/1 |
| 2008/0320194 A1* | 12/2008 | Vega | ..................... | G06F 9/4812 710/263 |
| 2009/0328059 A1* | 12/2009 | Haba | ....................... | G06F 9/544 719/312 |
| 2015/0149666 A1* | 5/2015 | Wang | ...................... | G06F 13/22 710/46 |
| 2019/0004871 A1* | 1/2019 | Sukhomlinov | ......... | G06F 9/541 |

OTHER PUBLICATIONS

John Shapley Gray, "Interprocess Communications in Linux" (2003), Pearson Education Inc., pp. 271-305.*
Wikipedia; Serialization; https://en.wikipedia.org/wiki/Serialization; Oct. 9, 2004.
Protocol Buffers; https://developers.google.com/protocol-buffers/; Apr. 3, 2012.
Apache Thrift; https://thrift.apache.org/; Nov. 5, 2010.

* cited by examiner

*Primary Examiner* — Brian W Wathen
(74) *Attorney, Agent, or Firm* — FisherBroyles, LLP

(57) ABSTRACT

The disclosed method may include (1) identifying a data object that (A) was generated by a producer process running on a computing device and (B) is to be accessed by a consumer process running on the computing device, (2) determining at least one structural characteristic of the data object that indicates how data is stored within the data object, (3) storing the data object and the structural characteristic of the data object within a portion of shared memory on the computing device that is accessible to both the producer process and the consumer process, and then (4) disclosing, to the consumer process, locations of both the data object and the structural characteristic of the data object within the shared memory such that the consumer process is able to extract the data in the data object from the shared memory. Various other methods, systems, and apparatuses are also disclosed.

18 Claims, 6 Drawing Sheets

APPARATUS, SYSTEM, AND METHOD FOR EFFICIENTLY SHARING DATA BETWEEN PROCESSES

BACKGROUND

In many of today's operating systems, certain computing operations involve and/or require passing data between processes running on a computing device. For example, a process may monitor status changes of another process by receiving runtime statistics generated by the other process. A process that generates data to be shared may be referred to as a producer process, and a process that receives the data may be referred to as a consumer process. Because this type of data sharing is common within many operating systems, various ways to facilitate producer-consumer relationships have been developed. As an example, a traditional data-sharing method may involve serializing data and then exporting the same from a producer process to a consumer process. In particular, this traditional data-sharing method may involve storing and/or accessing the data via system calls performed by both the producer and consumer processes.

Unfortunately, conventional data-sharing systems may be costly and/or inefficient. For example, serializing data for exportation to a consumer process may incur significant overhead for a producer process (e.g., dozens or hundreds of clock cycles). Further delay may be incurred while transferring the data to the consumer process. Moreover, a consumer process may require knowledge of the layout and/or type of data generated by a producer process in order to accurately interpret and/or utilize the data. In conventional data-sharing systems, this requirement may lead to additional communication (and therefore delays) between producer and consumer processes.

The instant disclosure, therefore, identifies and addresses a need for improved apparatuses, systems, and methods for efficiently sharing data between processes.

SUMMARY

As will be described in greater detail below, the instant disclosure generally relates to apparatuses, systems, and methods for efficiently sharing data between processes. In one example, a computer-implemented method for performing this task may include (1) identifying a data object that (A) was generated by a producer process running on a computing device and (B) is to be accessed by a consumer process running on the computing device, (2) determining at least one structural characteristic of the portion of data that indicates how data is stored within the data object, (3) storing the data object and the structural characteristic of the data object within a portion of shared memory on the computing device that is accessible to both the producer process and the consumer process, and then (4) disclosing, to the consumer process, locations of both the data object and the structural characteristic of the data object within the shared memory such that the consumer process is able to extract the data in the data object from the shared memory.

As another example, a system for implementing the above-described method may include various modules stored in memory. The system may also include at least one hardware processor that executes these modules. For example, the system may include (1) an identification module that identifies a data object that (A) was generated by a producer process running on a computing device and (B) is to be accessed by a consumer process running on the computing device, (2) a determination module that determines at least one structural characteristic of the data object that indicates how data is stored within the data object, (3) a storing module that stores the data object and the structural characteristic of the data object within a portion of shared memory on the computing device that is accessible to both the producer process and the consumer process, and (4) a disclosure module that discloses, to the consumer process, locations of both the data object and the structural characteristic of the data object within the shared memory such that the consumer process is able to extract the data in the data object from the shared memory.

As a further example, an apparatus for implementing the above-described method may include at least one storage device that contains shared memory accessible to multiple processes running on a computing device. In this example, the apparatus may also include at least one physical processing device communicatively coupled to the storage device, wherein the physical processing device (1) identifies a data object that (A) was generated by a producer process running on the computing device and (B) is to be accessed by a consumer process running on the computing device, (2) determines at least one structural characteristic of the data object that indicates how data is stored within the data object, (3) stores the data object and the structural characteristic of the data object within a portion of the shared memory that is accessible to both the producer process and the consumer process, and then (4) discloses, to the consumer process, locations of both the data object and the structural characteristic of the data object within the shared memory such that the consumer process is able to extract the data in the data object from the shared memory.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
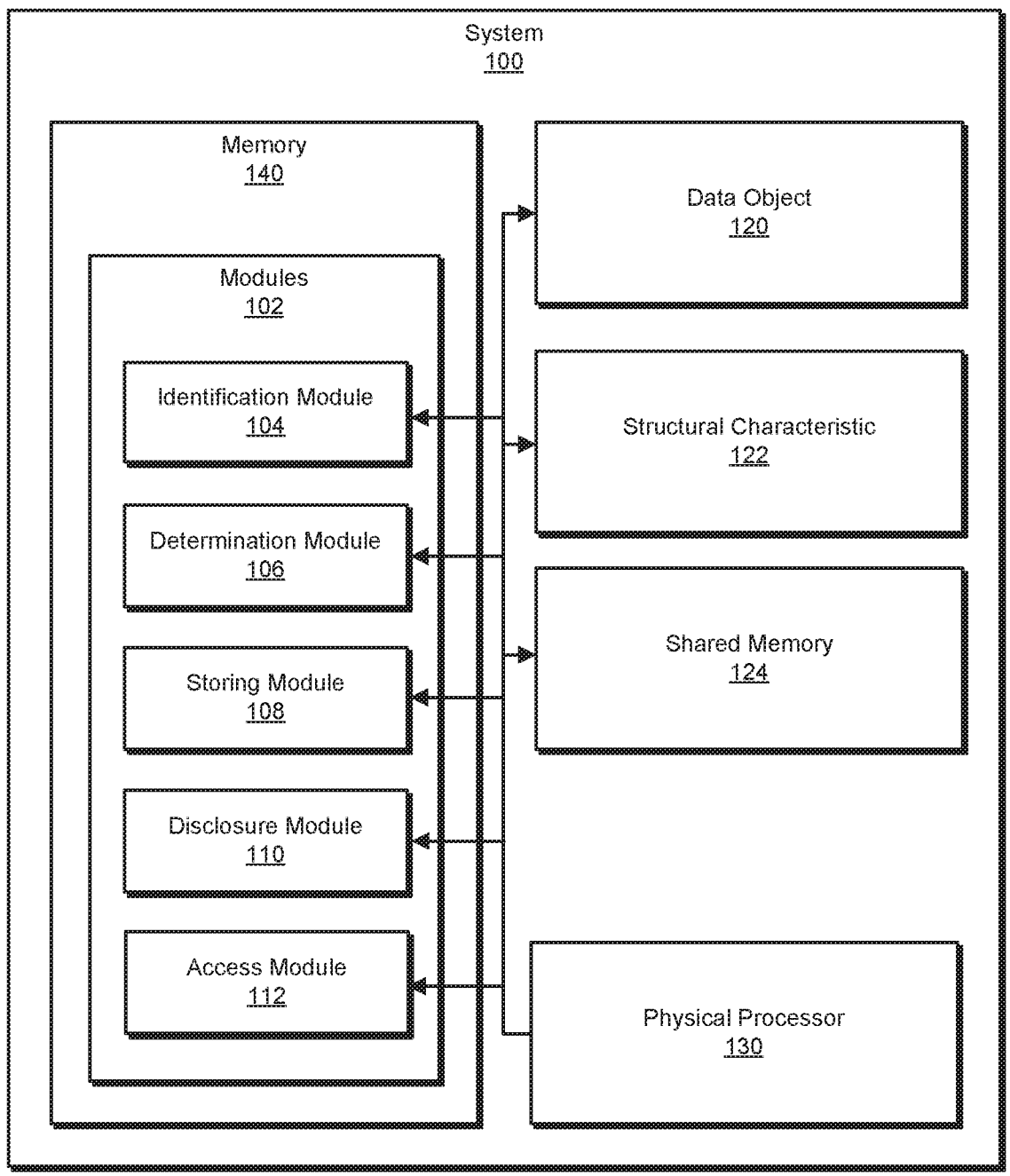
FIG. 1 is a block diagram of an exemplary system for efficiently sharing data between processes

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for efficiently sharing data between processes As will be explained in greater detail below, embodiments of the instant disclosure may enable a producer process running on a computing device to efficiently pass data to a consumer process running on the same device. For example, the disclosed systems and methods may store data generated by a producer process directly in shared memory (e.g., a shared file system) that is accessible to both the producer and consumer processes. In this way, the producer process may "expose" the data to the consumer process rather than "exporting" the data. By doing so, the producer process may avoid costly operations (such as system calls) involved in serializing and transmitting the data (which may be required by traditional data-sharing processes that first save data to a process memory of the producer process). Furthermore, by avoiding data serialization, embodiments of the instant disclosure may enable a producer process to efficiently share large data objects and/or large numbers of data objects. Thus, the disclosed data-sharing systems may provide greater scalability and efficiency compared to traditional systems.

Embodiments of the instant disclosure may also enable a producer process to provide, within a portion of shared memory, characteristics such as the layout, size, and/or type of a data object that is to be accessed by a consumer process. These characteristics may enable the consumer process to efficiently understand and/or parse the data object. By providing these characteristics to the consumer process via the shared memory, the disclosed systems and methods may decouple and/or reduce communication between the producer and consumer processes. Furthermore, the disclosed systems and methods may expose a data object and the layout of the data object to a consumer process during a single operation. For example, embodiments of the instant disclosure may enable a producer process to store both a data object and the layout of the data object within shared memory as the producer process generates the data object. As such, a consumer process may quickly (e.g., immediately) access and parse the data object.

The following will provide, with reference to FIGS. 1, 2, 4, and 5, detailed descriptions of exemplary systems for efficiently sharing data between processes. Detailed descriptions of corresponding computer-implemented methods will be provided in connection with FIG. 3. In addition, detailed descriptions of an exemplary computing system for carrying out these methods will be provided in connection with FIG. 6.

FIG. 1 is a block diagram of an exemplary system 100 for efficiently sharing data between processes. As illustrated in this figure, exemplary system 100 may include one or more modules 102 for performing one or more tasks. As will be explained in greater detail below, modules 102 may include an identification module 104, a determination module 106, a storing module 108, a disclosure module 110, and an access module 112. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices and/or physical processing units illustrated in FIG. 2 (e.g., computing device 202, processing unit 204, and/or processing unit 208). In addition, one or more of modules 102 may perform any of the functionality described herein in connection with any of the devices and/or processing units illustrated in FIG. 2. One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Additionally or alternatively, memory 140 may include and/or represent a portion of shared memory that is accessible to multiple processes running on a computing device. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate sharing data between two or more processes (e.g., processes executed by processor 130). Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, exemplary system 100 may also include one or more data objects, such as a data object 120. Data object 120 generally represents any type or form of data structure, portion of data, and/or formatted unit of data that is generated and/or accessed by a process running on a computing device. The terms "process" and "computing process," as used herein, generally refer to any instance of a program, application, and/or executable code that runs on and/or is executed by an operating system, processor, or computing device.

Data object 120 may include any type of information and may be generated by any type of process. In some examples, data object 120 may represent raw data generated by a process. Additionally or alternatively, data object 120 may represent a data structure that has been formatted by the disclosed systems such that the data within data object 120 may be accessed and/or stored.

As shown in FIG. 1, exemplary system 100 may also include one or more structural characteristics, such as a structural characteristic 122. Structural characteristic 122 generally represents one or combination of properties, attributes, and/or components of data object 120. As will be explained in greater detail below, structural characteristic 122 may represent an important and/or critical property of data object 120 that, when known to a process, may be used by the process to access, extract, and/or parse the data within data object 120. Examples of structural characteristic 122 include, without limitation, a layout of data object 120, a size of data object 120, a size, position and/or type of members within data object 120, a format of data object 120, a data object type of data object 120, and/or an offset of data within data object 120.

As illustrated in FIG. 1, exemplary system 100 may also include one or more portions of shared memory, such as a shared memory 124. Shared memory 124 generally represents any type or form of storage or memory infrastructure that is accessible to two or more processes and/or process threads running on a computing device. In some examples, shared memory 124 may be accessed by multiple processes that are executed by the same processor. Additionally or alternatively, shared memory 124 may be accessed by processes that are executed by different processors within the same computing device. For example, shared memory 124 may be accessible to various processes running within a multi-core or multi-processor computing device. Furthermore, shared memory 124 may be accessed by multiple processes running within a virtual machine (even if the processes are not running on the same physical device).

In some embodiments, shared memory 124 may be part of a file system that is shared by and/or accessible to multiple processes. Additionally or alternatively, shared memory 124 may represent a portion of RAM, a portion of ROM, a hard drive, a physical storage device, a virtual machine, a server, an online database, combinations of one or more of the same, variations of one or more of the same, and/or any additional type of memory that is accessible to multiple computing processes.

Figure 2:
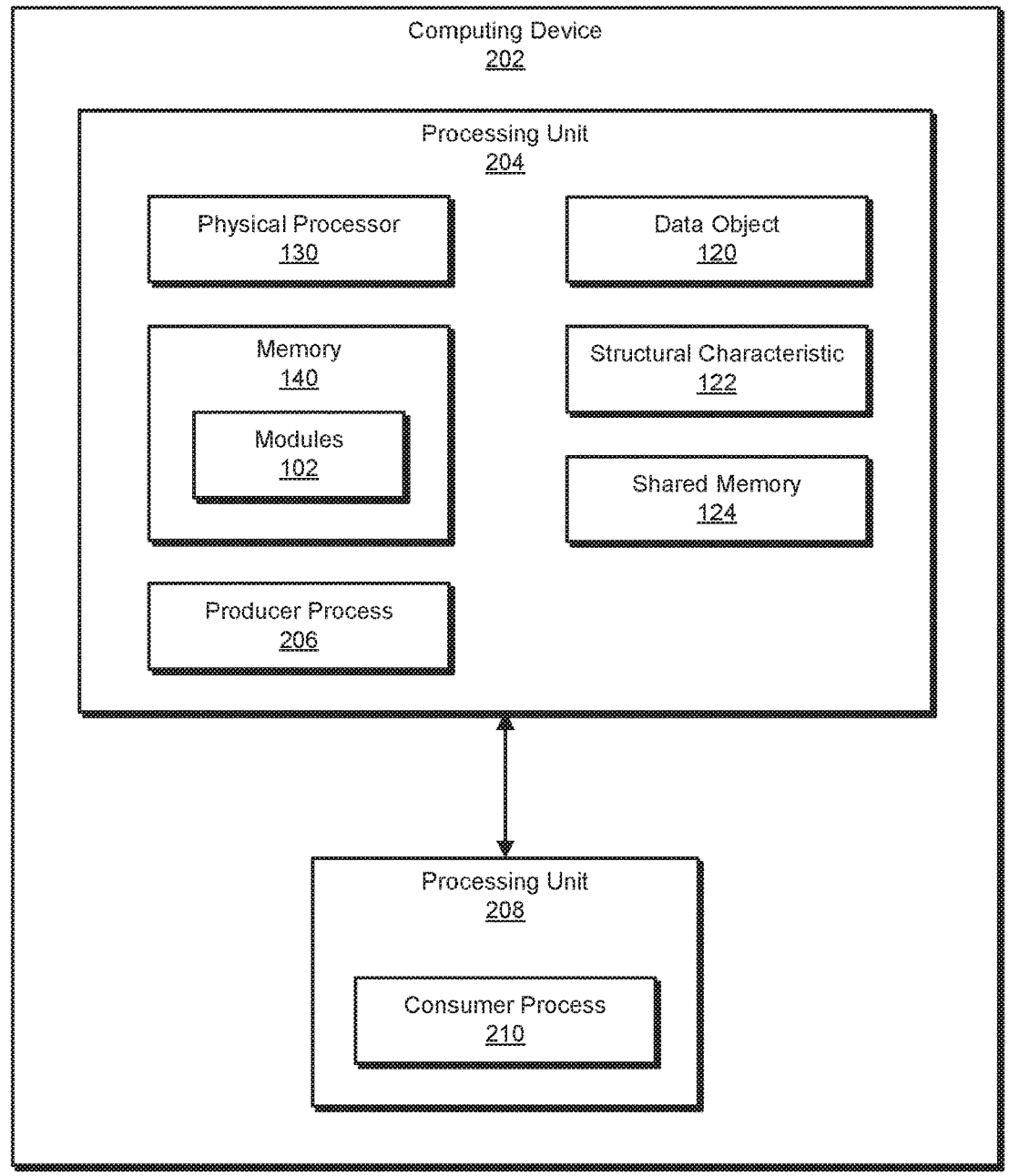
FIG. 2 is a block diagram of an additional exemplary system for efficiently sharing data between processes.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, all or a portion of the functionality of modules 102 may be performed by computing device 202. Specifically, as shown in FIG. 2, modules 102 may operate within and/or as part of a processing unit 204 and/or a processing unit 208. As will be described in greater detail below, one or more of modules 102 from FIG. 1 may, when executed by at least one processor of computing device 202, enable a process running on computing device 202 to share data with another process running on computing device 202.

Computing device 202 generally represents any type or form of physical computing device capable of reading computer-executable instructions. In one example, computing device 202 may include and/or represent a client device and/or network device that executes one or more producer and/or consumer processes. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, routers (such as provider edge routers, hub routers, spoke routers, autonomous system boundary routers, and/or area border routers), switches, hubs, modems, bridges, repeaters, gateways, multiplexers, network adapters, network interfaces, variations or combinations of one or more of the same, and/or any other suitable computing devices.

As shown in FIG. 2, computing device 202 may contain a processing unit 204 and a processing unit 208. Processing units 204 and 208 generally represent any type or form of computing environment and/or execution space within computing device 202. In one example, processing unit 204 and processing unit 208 may each represent one or more physical processors. Additionally or alternatively, processing unit 204 and processing unit 208 may each represent a software-based computing environment in which one or more processes are executed.

In the example of FIG. 2, processing unit 204 may execute a producer process 206. In addition, processing unit 208 may execute a consumer process 210. The term "producer process," as used herein, generally refers to any process that produces and/or generates data for consumption, access, and/or utilization by another process. This data may represent and/or include any type of information, such as a state of the producer process, runtime statistics of the producer process, and/or the output of a function or operation of the producer process. The term "consumer process," as used herein, generally refers to any process that requests, consumes, accesses, and/or utilizes data produced by a producer process. In some examples, this data may enable the consumer process to perform one or more functions or operations. In general, any type or form of process may act as a producer process and/or a consumer process (e.g., a process may operate as both a producer process and a consumer process at various points in time).

As shown in FIG. 2, processing unit 204 and processing unit 208 may be connected and/or in communication with each other. As will be explained in greater detail below, the disclosed systems may facilitate this communication such that consumer process 210 may efficiently access data produced by producer process 206.

Figure 3:
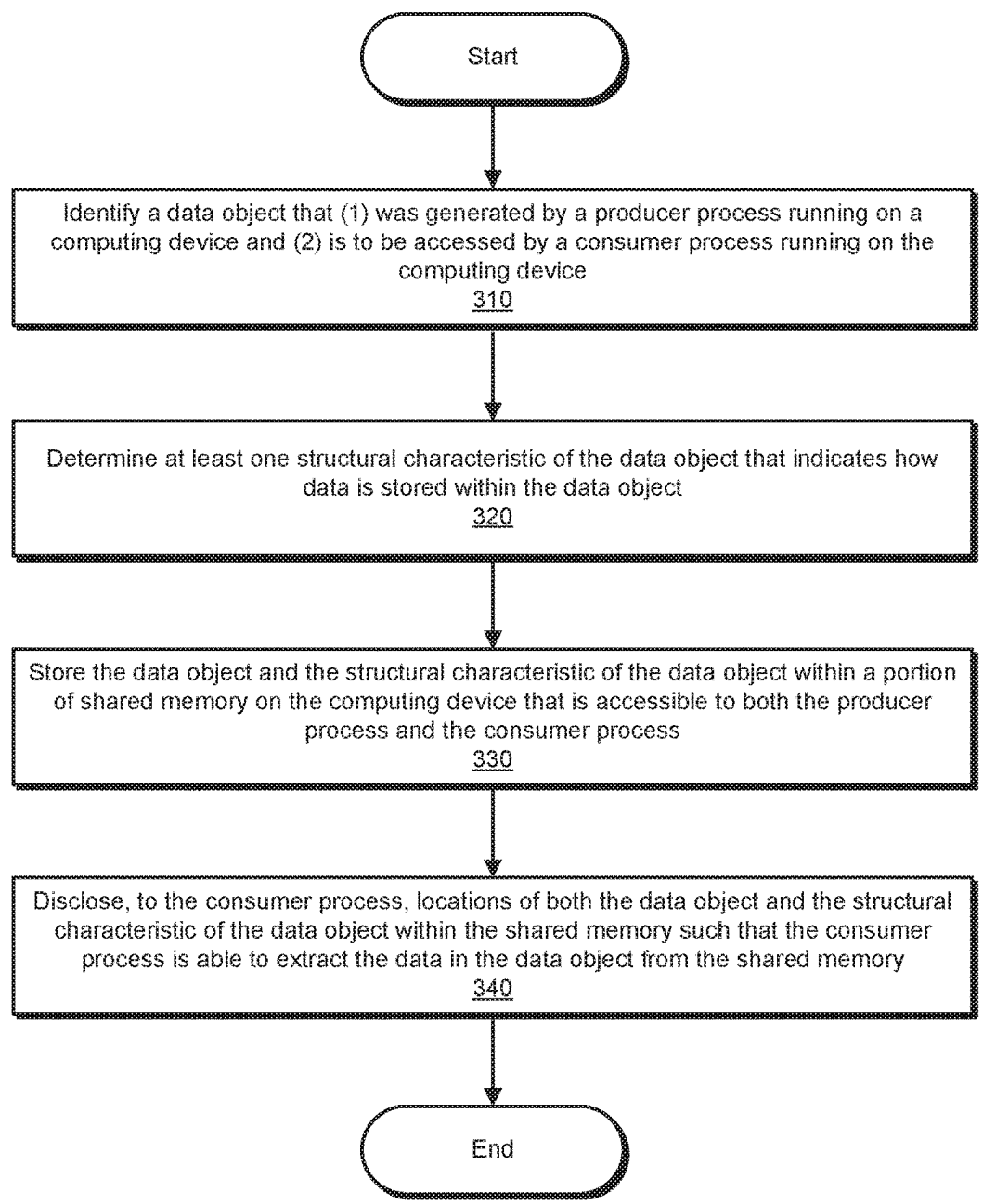
FIG. 3 is a flow diagram of an exemplary method for efficiently sharing data between processes.

FIG. 3 is a flow diagram of an example computer-implemented method 300 for efficiently sharing data between processes. The steps shown in FIG. 3 may be performed by any suitable computer-executable code and/or computing system, including system 100 in FIG. 1, system 200 in FIG. 2, system 400 in FIG. 4, system 500 in FIG. 5, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may identify a data object that (1) was generated by a producer process running on a computing device and (2) is to be accessed by a consumer process running on the computing device. For example, identification module 104 may, as part of computing device 202 and/or producer process 206 in FIG. 2, identify data object 120 after data object 120 is produced by producer process 206 and then determine that data object 120 is to be accessed by consumer process 210. In one example, identification module 104 may be implemented within and/or as part of producer process 206. In other examples, identification module 104 may monitor and/or communicate with producer process 206 while operating in the background of computing device 202.

The systems described herein may perform step 310 in a variety of ways and/or contexts. In some examples, identification module 104 may determine that producer process 206 is expected to generate data object 120 during execution. For example, identification module 104 may determine that producer process 206 is programmed to generate data that is required or requested by another process at a particular time while producer process 206 is running. In this example, identification module 104 may monitor producer process 206 while producer process 206 is running to detect when data object 120 is being generated and/or has been generated. Additionally or alternatively, identification module 104 may identify data object 120 by detecting particular types of data (such as "struct" type data objects) produced by producer process 206. In further examples, identification module 104 may identify data object 120 by receiving, from producer process 206, an indication that data object 120 has been generated. For example, producer process 206 may be configured to directly notify identification module 104 after producing data object 120.

Notably, identification module 104 may identify data object 120 immediately after the creation of data object 120. In this way, the disclosed systems may promptly (e.g., within several clock cycles) provide consumer process 210 with access to data object 120.

Returning to FIG. 3, at step 320 one or more of the systems described herein may determine at least one structural characteristic of the data object that indicates how data is stored within the data object. For example, determination module 106 may, as part of computing device 202 and/or producer process 206 in FIG. 2, determine structural characteristic 122 of data object 120. In one example, determination module 106 may be implemented within and/or as part of producer process 206. In other examples, determination module 106 may operate in the background of computing device 202.

The systems described herein may perform step 320 in a variety of ways and/or contexts. In some examples, determination module 106 may identify one or more structural characteristics of data object 120 based on the type of data included within data object 120. For example, producer process 206 may generate data composed of floating-point numbers, integers, arrays, strings, pointers, structures, and/or any other type or category of data. In addition, producer process 206 may generate data objects of various sizes and with various offsets. The type of data produced by producer process 206 may be controlled and/or depend on a variety of factors, such as the programming language in which producer process 206 operates and/or the specific functions producer process 206 is designed to perform.

In some embodiments, consumer process 210 may be unable to efficiently and/or accurately access and/or parse the data within data object 120 without knowledge of certain structural characteristics (e.g., a layout, size, etc.) of data object 120. For example, without knowing whether data object 120 is composed of 32-bit integers or 64-bit integers, consumer process 210 may be unable to decipher and/or interpret the data within data object 120. Accordingly, determination module 106 may identify any and/or all properties of data object 120 that may enable consumer process 210 to fully access and/or utilize data object 120. These properties may be represented by and/or referred to as structural characteristic 122.

Determination module 106 may determine structural characteristic 122 in a variety of ways. In some examples, determination module 106 may determine structural characteristic 122 by parsing and/or analyzing the data within data object 120 after producer process 206 has generated data object 120. For example, determination module 106 may obtain structural characteristic 122 using a debugging tool (such as DWARF) that identifies properties such as the layout and/or size of data object 120 and/or the size, position, number, and/or type of members within data object 120. In another example, determination module 106 may determine structural characteristic 122 using a standardized set of instructions (e.g., a macro) that is designed to extract such properties of data object 120.

Returning to FIG. 3, at step 330 one or more of the systems described herein may store the data object and the structural characteristic of the data object within a portion of shared memory on the computing device that is accessible to both the producer process and the consumer process. For example, storing module 108 may, as part of computing device 202 and/or producer process 206 in FIG. 2, store data object 120 and structural characteristic 122 within shared memory 124. In one example, storing module 108 may be implemented within and/or as part of producer process 206. In other examples, storing module 108 may operate in the background of computing device 202.

The systems described herein may perform step 330 in a variety of ways and/or contexts. In some examples, storing module 108 may directly store data object 120 within shared memory 124. For example, storing module 108 may transfer data object 120 to shared memory 124 without first copying data object 120 to a process memory (e.g., a portion of memory utilized solely by producer process 206). Additionally or alternatively, storing module 108 may transfer data object 120 to shared memory 124 without serializing data object 120. The term "serialization," as used herein, generally refers to any type or form of process that translates and/or reformats data such that the data may be stored and/or transmitted. In some examples, serializing a data object may preserve the original structure of the data object, thereby enabling the data object to be accessed and/or recovered after it has been stored. However, serializing a data object may often require extensive time and/or computing resources.

In one embodiment, storing module 108 may store data object 120 within shared memory 124 using an application program interface (API) or similar mechanism. For example, storing module 108 may implement an API that stores data object 120 within shared memory 124 without serializing data object 120. Additionally, in some embodiments, while storing data object 120 within shared memory 124, storing module 108 may configure an additional and/or similar API within data object 120. This API may be designed to provide consumer process 210 with access to data object 120.

As mentioned above, shared memory 124 may represent and/or be part of a shared file system on computing device 202. As an example, shared memory 124 may represent all or a portion of a "/dev/shm/" file system within a LINUX operating system. In this example, storing module 108 may store data object 120 within a portion of this file system that is associated with the data object type of data object 120. For example, in the event that data object 120 is a "struct" data object of type "router" with an instance name "R1", storing module 108 may store data object 120 within a file identified by "/dev/shm/router/R1". As another example, storing module 108 may store a "struct" data object of type "flow" with an instance name "F1" within a file identified by "/dev/shm/flow/F1".

In some embodiments, storing module 108 may store structural characteristic 122 in connection with data object 120. For example, storing module 108 may store structural characteristic 122 at a memory address that is adjacent and/or close to the memory address of data object 120 within shared memory 124. Additionally or alternatively, storing module 108 may store structural characteristic 122 within a file that is associated with data object 120. For example, storing module 108 may store structural characteristic 122 within a catalog file that is on top of and/or connected to shared memory 124. Continuing with the "struct router" data object example above, storing module 108 may store structural characteristic 122 within a catalog file identified by "/dev/shm/router/.catalog". This catalog file may be part of the same shared file system in which the "R1" data object is located.

In some examples, data object 120 may contain a pointer and/or reference to one or more additional data objects. In these examples, storing module 108 may store each data object that is referenced by data object 120 within shared memory 124. In addition, storing module 108 may store any and/or all relevant structural characteristics about the referenced data objects in connection with the referenced data objects. In some embodiments, storing module 108 may store such referenced data objects separately within shared memory 124 (e.g., within separate files of a shared file system). However, storing module 108 may retain an appropriate reference and/or pointer within data object 120 such that the relationship between the data objects is disclosed to consumer process 210.

Returning to FIG. 3, at step 340 one or more of the systems described herein may disclose, to the consumer process, locations of both the data object and the structural characteristic of the data object within the shared memory such that the consumer process is able to extract the data in the data object from the shared memory. For example, disclosure module 110 may, as part of computing device 202 and/or producer process 206 in FIG. 2, disclose the locations of data object 120 and structural characteristic 122 within shared memory 124 to consumer process 210. In one example, disclosure module 110 may be implemented within and/or as part of producer process 206. In other examples, disclosure module 110 may operate in the background of computing device 202.

The systems described herein may perform step 340 in a variety of ways and/or contexts. In some examples, disclosure module 110 may disclose the location of data object 120 by creating a pointer that identifies the memory address of data object 120 within shared memory 124. For example, disclosure module 110 may create an entry for data object 120 within a lookup table accessible to consumer process 210. This entry may have a key that corresponds to the memory address of data object 120 and a value that corresponds to the instance name of data object 120. In some embodiments, this lookup table may be associated with the data object type of data object 120. Following the above "struct router" data object example, disclosure module 110 may disclose the location of the "R1" data object by creating a lookup table entry within a lookup table identified by "/dev/shm/router/.object_lookup_table". This entry may direct consumer process 210 to the "R1" data object within shared memory 124 and/or to the catalog file associated with the "R1" data object.

Figure 4:
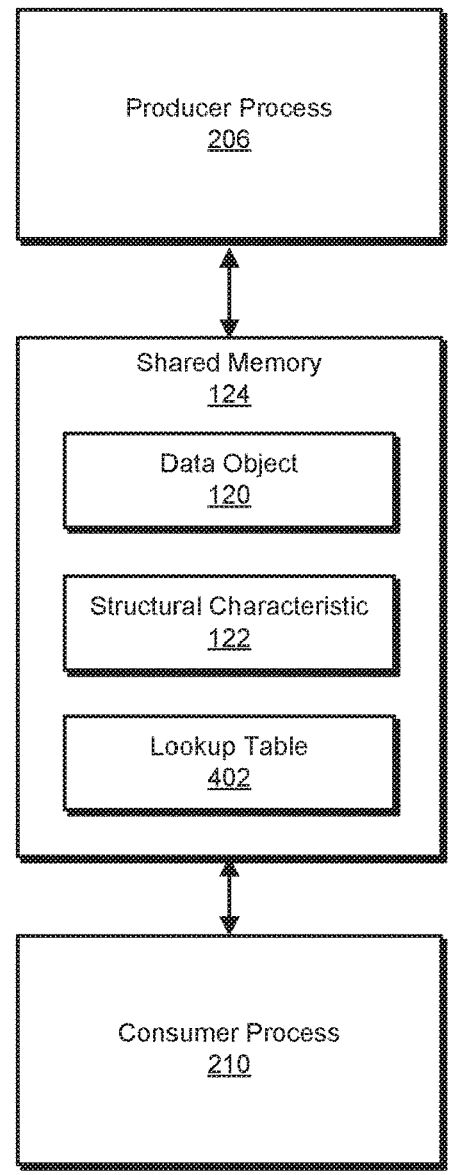
FIG. 4 is a block diagram of an additional exemplary system for efficiently sharing data between processes.

FIG. 4 illustrates a system 400 that describes an exemplary embodiment of the disclosed data-sharing systems. In this example, shared memory 124 may include and/or be associated with a lookup table 402. While storing data object 120 within shared memory 124, producer process 206 may create an entry within lookup table 402 that identifies the memory address of data object 120 within shared memory 124. By doing so, consumer process 210 may identify the location of data object 120 by querying and/or accessing lookup table 402. Although FIG. 4 shows structural characteristic 122 and lookup table 402 contained within shared memory 124, structural characteristic 122 and/or lookup table 402 may be stored in any suitable manner and/or location such that these items are available to consumer process 210.

Consumer process 210 may access data object 120 within shared memory 124 in a variety of ways. In some examples, access module 112, implemented as part of consumer process 210, may retrieve data object 120 from shared memory 124 after determining that data object 120 has been stored within shared memory 124. For example, access module 112 may receive, from producer process 206, an indication that data object 120 has been stored within shared memory 124. Specifically, disclosure module 110 (as part of producer process 206) may use a notification mechanism (such as inotify) provided by an operating system of computing device 202 to notify consumer process 210 about the availability of data object 120.

In other examples, access module 112 may continuously or periodically poll shared memory 124 to detect when data object 120 is available within shared memory 124. Notably, in contrast to requests sent by consumer processes in traditional data-sharing systems, these requests may be agnostic with respect to factors such as a layout of data object 120 and a programming language used by producer process 206 to generate data object 120. For example, access module 112 may access data object 120 within shared memory 124 via an API implemented within data object 120, as mentioned above. This API may be capable of providing access module 112 with data object 120 regardless of whether the programming language in which consumer process 210 is written matches the programming language in which producer process 206 is written.

In some embodiments, consumer process 210 may also access structural characteristic 122 via the API within data object 120. For example, the API may provide the catalog file that stores structural characteristic 122 to consumer process 210. As mentioned above, structural characteristic 122 may indicate any property and/or feature of data object 120 that is required for consumer process 210 to extract, understand, and/or parse the data within data object 120. By providing structural characteristic 122 to consumer process 210 via an API within data object 120, the disclosed systems may enable consumer process 210 to request and/or access data object 120 prior to knowing structural characteristic 122. In addition, the disclosed systems may enable consumer process 210 to access and parse data object 120 without direct communication with producer process 206.

Figure 5:
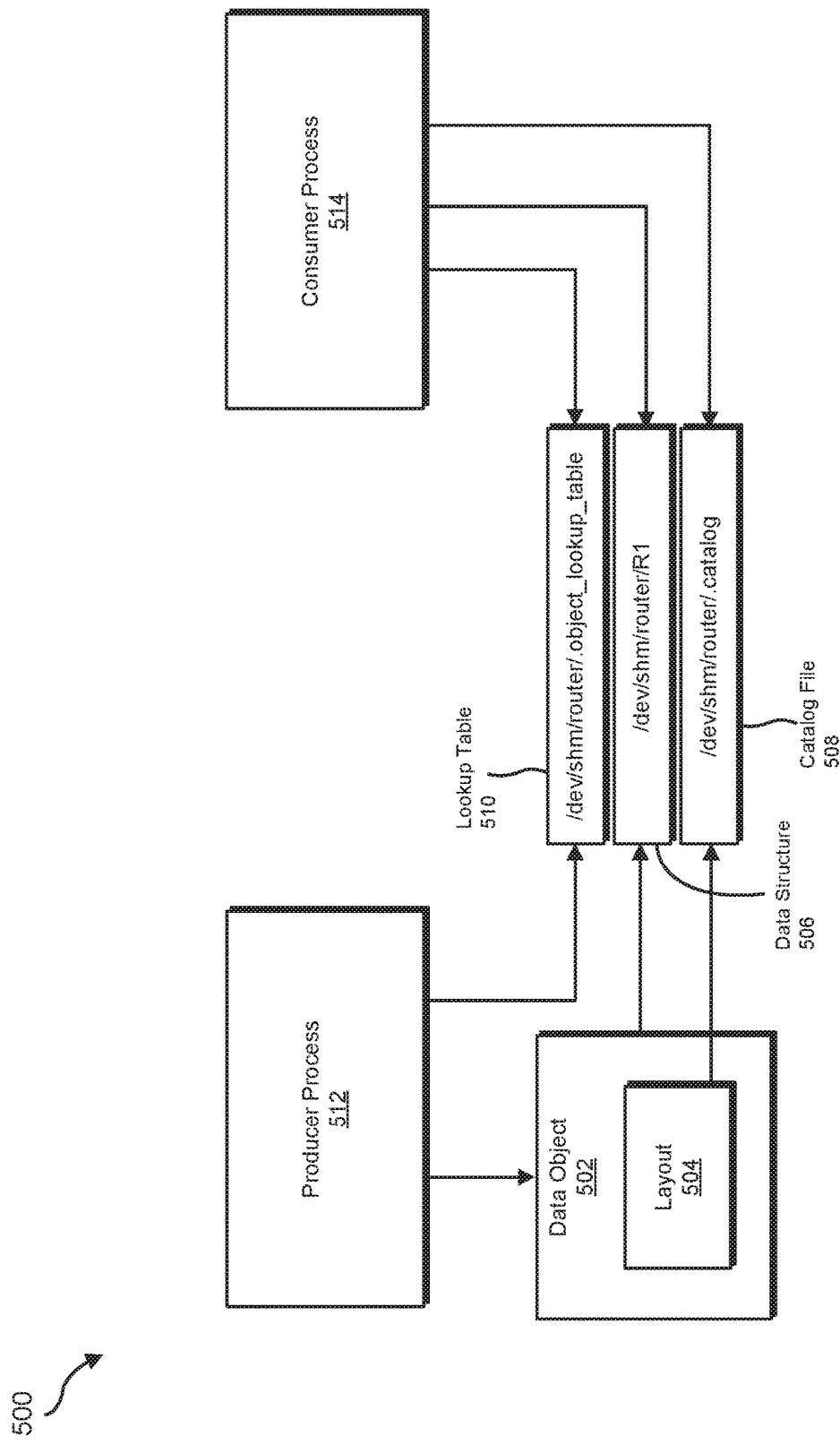
FIG. 5 is a block diagram of an additional exemplary system for efficiently sharing data between processes.

FIG. 5 illustrates a system 500 that describes an additional exemplary embodiment of the disclosed data-sharing systems. In this example, a producer process 512 may produce a data object 502 that is to be accessed by a consumer process 514. To initiate the process of passing data object 502 to consumer process 514, producer process 512 may determine a layout 504 of data object 502. Layout 504 may represent any configuration detail and/or property of data object 502 that is relevant and/or necessary for consumer process 514 to understand data object 502.

Continuing with the example of FIG. 5, producer process 512 may store data object 502 in a data structure 506. In this example, data structure 506 may be located within a file system that is accessible to both producer process 512 and consumer process 514. Notably, producer process 512 may directly store data object 502 within data structure 506 (i.e., without serializing data object 502 or first storing data object 502 within a process memory of producer process 512). Producer process 512 may also store layout 504 within a catalog file 508 that is associated with data structure 506. In addition, producer process 512 may add an entry to a lookup table 510. This entry may map an instance name of data object 502 to a memory address of data structure 506 within the shared file system.

In the example of FIG. 5, consumer process 514 may determine that data structure 506 has been stored within the shared file system. For example, consumer process 514 may periodically poll the shared file system and/or lookup table 510 to detect when data object 502 has been stored within data structure 506. In one embodiment, consumer process 514 may specifically request to access data structure 506 (i.e., consumer process 514 may request to access the "R1" data object). However, consumer process 514 may be unaware of the size, layout, and/or format of data structure 506. After identifying a reference to data structure 506 within lookup table 510, consumer process 514 may dynamically render data object 502 (via, e.g., an API within data structure 506). In addition, consumer process 514 may identify layout 504 by accessing catalog file 508. Consumer process 514 may access catalog file 508 via the API within data structure 506 and/or via any suitable mechanism. Consumer process 514 may then use layout 504 to efficiently and accurately parse and/or interpret the data within data object 502.

Producer process 512 and consumer process 514 within FIG. 5 may represent various type of processes. In one embodiment, producer process 512 may represent and/or include a virtual network function (VNF). In this embodiment, producer process 512 may expose runtime statistics to an application running on the same host system such that the application may create and/or export heuristic data based on the exposed statistics. In another embodiment, producer process 512 may represent a hypertext transfer protocol (HTTP) proxy server application that shares information about particular domains and/or webpages accessed by the application. In a further embodiment, producer process 512 may represent an application that shares data indicative of the health and/or status of the application. In this embodiment, consumer process 514 may operate as a "watchdog" or other type of monitoring application that analyzes the shared data to identify and correct performance deficiencies and/or security threats within producer process 512. In general, the disclosed systems and methods may facilitate efficient data transfer between any type or form of processes and for any suitable purpose.

Figure 6:
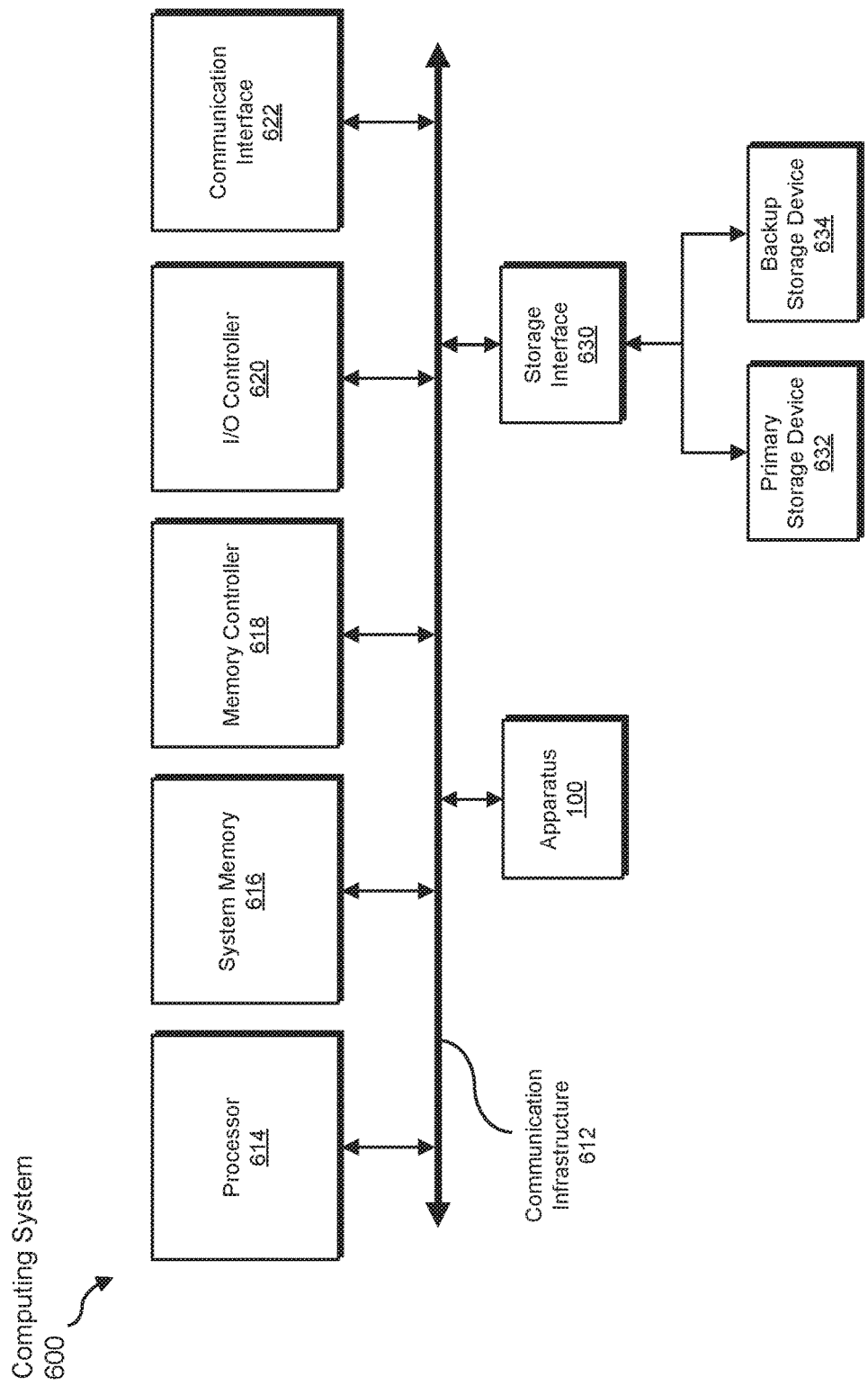
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods, or processes described and/or illustrated herein.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   identifying a data object that:
      was generated by a producer process running on a computing device; and
      is to be accessed by a consumer process running on the computing device;
   determining at least one structural characteristic of the data object that indicates how data is stored within the data object;
   storing, within a portion of shared memory on the computing device that is accessible to both the producer process and the consumer process:
      the data object; and
      the structural characteristic of the data object;
   disclosing, to the consumer process, locations of both the data object and the structural characteristic of the data object within the shared memory such that the consumer process is able to extract the data in the data object from the shared memory; and
   accessing, by the consumer process, the data in the data object by extracting the data object from the shared memory, wherein extracting the data object from the shared memory comprises receiving the data in the data object via an application program interface that operates as part of the data object within the shared memory.

2. The method of claim 1, wherein determining the structural characteristic of the data object comprises extracting a layout of binary data within the data object.

3. The method of claim 1, wherein storing the structural characteristic of the data object within the portion of shared memory comprises:
   storing the structural characteristic within a catalog file; and
   associating the catalog file with the data object stored in the shared memory.

4. The method of claim 1, wherein disclosing the location of the data object to the consumer process comprises creating, within a lookup table accessible to the consumer process, a table entry that maps an identifier of the data object to a memory address of the data object within the shared memory.

5. The method of claim 1, wherein storing the data object within the shared memory comprises storing the data object within the shared memory without serializing the data within the data object.

6. The method of claim 1, wherein accessing, by the consumer process, the data in the data object comprises:
   identifying the structural characteristic of the data object within the shared memory; and
   parsing the data in the data object based on the structural characteristic.

7. The method of claim 1, wherein accessing the data in the data object comprises periodically polling, by the consumer process, the shared memory to detect when the data is available to be accessed by the consumer process.

8. The method of claim 7, wherein polling the shared memory comprises sending, to the shared memory, an agnostic request for the data that is independent of a programming language used to generate the producer process.

9. A system comprising:
   an identification module, stored in memory, that identifies a data object that:
      was generated by a producer process running on a computing device; and
      is to be accessed by a consumer process running on the computing device;
   a determination module, stored in memory, that determines at least one structural characteristic of the data object that indicates how data is stored within the data object;
   a storing module, stored in memory, that stores, within a portion of shared memory on the computing device that is accessible to both the producer process and the consumer process:
      the data object; and
      the structural characteristic of the data object;
   a disclosure module, stored in memory, that discloses, to the consumer process, locations of both the data object and the structural characteristic of the data object within the shared memory such that the consumer process is able to extract the data in the data object from the shared memory;
   an access module, stored in memory, that accesses, as part of the consumer process, the data in the data object by extracting the data object from the shared memory, wherein extracting the data object from the shared memory comprises receiving the data in the data object via an application program interface that operates as part of the data object within the shared memory; and at least one hardware processor configured to execute the identification module, the determination module, the storing module, the disclosure module, and the access module.

10. The system of claim 9, wherein the determination module determines the structural characteristic of the data object by extracting a layout of binary data within the data object.

11. The system of claim 9, wherein the storing module stores the structural characteristic of the data object within the portion of shared memory by:

storing the structural characteristic within a catalog file; and associating the catalog file with the data object stored in the shared memory.

12. The system of claim 9, wherein the disclosure module discloses the location of the data object to the consumer process by creating, within a lookup table accessible to the consumer process, a table entry that maps an identifier of the data object to a memory address of the data object within the shared memory.

13. The system of claim 9, wherein the storing module stores the data object within the shared memory by storing the data object within the shared memory without serializing the data within the data object.

14. The system of claim 9, wherein the access module accesses the data in the data object by:

identifying the structural characteristic of the data object within the shared memory; and parsing the data in the data object based on the structural characteristic.

15. The system of claim 9, wherein the access module accesses the data in the data object by periodically polling the shared memory to detect when the data is available to be accessed by the consumer process.

16. The system of claim 15, wherein the access module polls the shared memory by sending, to the shared memory, an agnostic request for the data that is independent of a programming language used to generate the producer process.

17. An apparatus comprising:

at least one storage device that contains shared memory accessible to a plurality of processes running on a computing device; and at least one physical processing device communicatively coupled to the storage device, wherein the physical processing device:

identifies a data object that:

was generated by a producer process running on the computing device; and is to be accessed by a consumer process running on the computing device;

determines at least one structural characteristic of the data object that indicates how data is stored within the data object;

stores, within a portion of the shared memory that is accessible to both the producer process and the consumer process:

the data object; and the structural characteristic of the data object;

discloses, to the consumer process, locations of both the data object and the structural characteristic of the data object within the shared memory such that the consumer process is able to extract the data in the data object from the shared memory; and accesses, as part of the consumer process, the data in the data object by extracting the data object from the shared memory, wherein extracting the data object from the shared memory comprises receiving the data in the data object via an application program interface that operates as part of the data object within the shared memory.

18. The apparatus of claim 17, wherein the physical processing device discloses the location of the data object to the consumer process by creating, within a lookup table accessible to the consumer process, a table entry that maps an identifier of the data object to a memory address of the data object within the shared memory.

* * * * *